United States Patent [19]

Klemarczyk

[11] Patent Number: 4,684,538
[45] Date of Patent: Aug. 4, 1987

[54] POLYSILOXANE URETHANE COMPOUNDS AND ADHESIVE COMPOSITIONS, AND METHOD OF MAKING AND USING THE SAME

[75] Inventor: Philip T. Klemarczyk, Collinsville, Conn.

[73] Assignee: Loctite Corporation, Newington, Conn.

[21] Appl. No.: 831,785

[22] Filed: Feb. 21, 1986

[51] Int. Cl.$^4$ ............................................. B05D 3/06
[52] U.S. Cl. ................................. 427/54.1; 427/36; 427/35; 427/44; 428/424.2; 428/424.8; 428/428; 428/447; 528/28
[58] Field of Search ............ 528/28; 428/424.2, 424.8, 428/428, 447; 427/54.1, 36, 44, 35

[56] References Cited

U.S. PATENT DOCUMENTS

| | | | |
|---|---|---|---|
| 4,130,708 | 12/1978 | Friedlander et al. | 528/28 |
| 4,369,300 | 1/1983 | Carter et al. | 528/28 |
| 4,582,885 | 4/1986 | Barber | 528/28 |
| 4,605,712 | 8/1986 | Muellar et al. | 528/28 |

FOREIGN PATENT DOCUMENTS

| | | |
|---|---|---|
| 2005183 | 4/1984 | Australia . |
| 1134984 | 11/1982 | Canada . |
| 0127321 | 12/1984 | European Pat. Off. . |
| 8400424 | 2/1984 | PCT Int'l Appl. . |
| 2110702 | 6/1983 | United Kingdom . |

OTHER PUBLICATIONS

Harasta, L. P. et al, "Radiation-Curable Overcoat Composition and Toner-Imaged Elements Containing Same," Research Disclosure, May, 1983, pp. 188-190.

The American Heritage Dictionary, Second College Edition, p. 89, Houghton Mifflin Co, Boston, 1982.

Primary Examiner—Melvyn I. Marquis
Attorney, Agent, or Firm—Steven J. Hultquist

[57] ABSTRACT

Silicone urethane compounds, e.g., a polysiloxane urethane (meth)acrylate, obtained as a reaction product of a polysiloxane carbinol, a polyisocyanate, and a polyfunctional compound having at least one functional group which is reactive with an isocyanate group of the polyisocyanate and after reaction therewith provides an ethylenic functional group in the reaction product. The polysiloxane carbinol has a molecular weight of from about 5,000 to about 50,000 and has R'OH end groups wherein R' is linear $C_4$–$C_{20}$ alkylene. Such carbinol may be obtained as a reaction product of the corresponding hydride-terminated polysiloxane and a linear $C_4$–$C_{20}$ $\omega$-alkenyl alcohol. The hydride-terminated polysiloxane in turn may be obtained as a reaction product of either (i) the corresponding silanol of molecular weight at least 10,000 and a hydridosilane having one or more hydrolyzable groups attached to the silicon atom, or (ii) a cyclosiloxane and a 1,3-dihydrido disiloxane.

The disclosed compounds may be utilized in adhesive compositions for substrates including bonding surfaces such as glass, and polymers and copolymers of ethylenically unsaturated monomers. The bonding of such substrates may suitably be carried out at least partially under anoxic conditions, e.g., with elevated temperature and/or actinic radiation curing of the bonding composition in a substantially oxygen-free environment. A preferred vacuum degassing/anoxic curing process is disclosed for such bonding compositions, which is particularly advantageous for difficult to bond substrates, such as low density polyethylene.

6 Claims, 2 Drawing Figures

POLYSILOXANE URETHANE COMPOUNDS AND ADHESIVE COMPOSITIONS, AND METHOD OF MAKING AND USING THE SAME

BACKGROUND OF THE INVENTION

1. Field of the Invention

This invention generally relates to siloxane urethane (meth)acrylate compounds and compositions containing same, useful as adhesives and coatings which are curable under elevated temperature and/or actinic radiation exposure conditions, and to methods of making and using such compounds and compositions.

2. Description of the Related Art

U.S. Pat. No. 4,130,708 to C. B. Friedlander, et al discloses radiation curable monomeric or oligomeric compounds, formed as reaction products of a siloxy-containing polycarbinol, a polyisocyanate, and a polyfunctional compound, which form protective films having good slip properties, fast cure and high abrasion resistance on paper and paperboard stock. The polyfunctional compound has at least one functional group, e.g., hydroxy, which is reactive with an isocyanato group of the polyisocyanate and after reaction therewith provides at least one ethylenic functional group, e.g., acrylyl, in the reaction product. At least one urethane moiety is formed by the polyisocyanate at a reactive carbinol group of the polycarbinol.

The polycarbinol contains at least two hydroxyl groups per molecule, positioned terminally or along the siloxane backbone, with preferred polycarbinol compounds having average molecular weights of about 800 to about 6,000. Among the various polycarbinol compounds disclosed are polydimethylsiloxane having terminal hydroxy groups wherein the carbyl portion of the carbinol group attached to the silicon atom is alkylene, e.g., ethylene, 1,2-propylene, 1,4-butylene, and the like (column 4, lines 40-41).

To form such reaction products, the Friedlander et al patent discloses at column 5, lines 21-25 to react the polycarbinol and polyisocyanate to form a siloxane-urethane intermediate having at least one terminal isocyanato group, followed by reaction of the intermediate with the polyfunctional, e.g., hydroxyacrylate, compound. The polyfunctional compound may be utilized in excess in the reaction, as a reactive diluent for the reaction product. It is disclosed to use the reaction product as an additive to coating compositions containing other radiation polymerizable components, such as polyesters, polyurethanes and polyamides.

At column 7, lines 44-64 of the patent, various substrates utilizable with such compositions are disclosed, as including polymeric substrates, e.g., polyesters, polyamides, cured phenolic resins, cured aminoplasts, acrylics, polyurethanes and rubber; vinyl-containing polymerizable compositions, e.g., vinyl chloride, vinyl acetate, vinyl fluoride, vinylidene chloride and "copolymerizable combinations of [such] vinyl-containing compounds with ethylene or propylene" (column 7, lines 60-64); inorganic substrates such as glass, quartz and ceramic materials; and metallic substrates including iron, steel and aluminum.

Acrylated urethane silicone compounds formed as reaction products of a silicone carbinol, a polyisocyanate and a hydroxy-functional acrylate are also disclosed in U.S. Pat. No. 4,369,300 and Canadian Pat. No. 1,134,984 to R. G. Carter, et al. The Canadian patent discloses (at page 4) that the silicone carbinol may be of the polydimethylsiloxy type, containing from 1-1,000 siloxy repeating units in its backbone and having terminal R'OH groups wherein R' is $C_1$-$C_{16}$ alkylene.

L. P. Harasta, et al in an article entitled "Radiation-Curable Overcoat Compositions and Toner-Imaged Elements Containing Same", *RESEARCH DISCLOSURE*, May, 1983, pages 188-190 disclose curable coating compositions comprising (a) either (i) a mixture of a siloxy-containing polycarbinol and an acrylated urethane or (ii) a siloxy-containing acrylated urethane, (b) a multifunctional acrylate, and optionally (c) a free radical photoinitiator. The multi-functional acrylate in such composition may be present in an amount of about 20-95%, based on total composition weight, and is an acrylic monomer comprising at least two acrylic ester groups.

Australian Patent Application No. 20051/83 of K. F. Mueller, et al discloses polysiloxane copolymer compositions useful for making contact lenses, comprising the crosslinked copolymerization product of (a) about 8-70% by weight of a linear or branched polysiloxane macromer containing at least two terminal or pendant polymerizable olefinic groups per each 5,000 molecular weight unit of polysiloxane, attached to the polysiloxane through at least two urethane linkages, and (b) about 30-92% by weight mono-olefinic and/or diolefinic monomers, 85-100% by weight of which are water-insoluble. The application discloses to form the polysiloxane macromer by reaction of a siloxane having terminal hydroxyalkyl groups, wherein the alkyl moiety is $C_2$-$C_6$ alkylene, with a di- or tri-isocyanate to form a prepolymer (polysiloxane polyisocyanate) intermediate, which is end capped with an active hydrogen monomer such as acrylates or methacrylates. Among the disclosed monomers useful for copolymerization with the (meth)acrylate-capped silicone urethane are methyl methacrylate and isobornyl methacrylate, preferably in admixture with 1-25 weight percent of a short chain crosslinking agent, e.g., neopentylene glycol diacrylate, ethylene glycol dimethacrylate, or isophorone diisocyanate/2-hydroxyethyl methacrylate reaction products.

PCT Patent Application No. WO84/00424 of R. E. Ansel, et al discloses a radiation-curable coating for optical fibers, comprising an organic polysiloxane with 2-6 monoethylenically unsaturated side chains each containing an acrylic or methacrylic group, and with about one such side chain for every 500-5,000 units of molecular weight. Such polysiloxanes are formed from corresponding compounds whose side chains include saturated aliphatic hydrocarbon groups containing two to four carbon atoms, e.g., 2-hydroxypropyl, or polyoxyalkylene ethers in which the alkylene group contains from two to four carbon atoms, e.g., hydroxy polyoxypropyl, such hydroxyl functional groups being reacted with a (meth)acrylate carrying a single isocyanate group. The application at page 7, lines 25-33 discloses to add monoethylenic monomers, such as mono- or poly-acrylates to the polysiloxane reaction product to adjust the viscosity of the coating composition.

UK Patent Application No. 2,110,702 describes radiation-curable oligomeric compositions useful for making optical elements and comprising polysiloxane, diurethane and methacrylate moieties. The polysiloxane moiety may be of the formula where b' is 6–35, and R is a linear or branched $C_1-C_{12}$ alkylene. Polysiloxane polyols, e.g., hydroxy-terminated diorganosiloxanes, and siloxanes with reactive hydroxyl groups bonded to at least two of its silicon atoms, are disclosed as useful precursors for the siloxane moiety of the molecule; the diurethane moiety of the molecule may be formed from polyisocyanates such as isophorone diisocyanate (IPDI); and the acrylate portion of the compound may be derived from hydroxy (meth)acrylates or hydroxyalkyl (meth)acrylates. A radiation addition-polymerizable mono- or poly-functional diluent monomer, e.g., methyl methacrylate or isobornyl methacrylate, may be added to the oligomer product, to lower the viscosity of the composition and insure requisite crosslink density in plastic articles formed therefrom.

European Patent Application No. 127,321 of S. W. Bany, et al describes compositions for forming contact lenses, comprising organopolysiloxane monourethane acrylate monomers of 500–20,000 molecular weight, which are copolymerized with ethylenically unsaturated monomers and have terminal acryl-or methacryloyloxyalkylcarbamoyloxyalkyl groups of the formula wherein $R^2$ is hydrogen or methyl, c is 2–6, and d is 1–12. Such organopolysiloxane urethane (meth)acrylates may be formed by reacting the corresponding hydroxyalkyl-terminated organopolysiloxanes with isocyanato alkyl (meth)acrylates; the hydroxyalkyl-terminated organopolysiloxanes in turn may be prepared by platinum catalyzed reaction of the corresponding silicon hydride-terminated polysiloxane with "an hydroxy-group-protected ω-alkenyl alcohol forming an organopolysiloxane having protected terminal hydroxy groups that on removal yield the desired organopolysiloxane having terminal hydroxyalkyl groups" (page 8, lines 4–7). An illustrative synthesis is shown at page 8, lines 11–40 of the application, as including the platinum-catalyzed reaction of an Si-H terminated dimethylsiloxane with propenyloxytrimethylsilane to yield the corresponding polydimethylsiloxane with trimethylsiloxypropyl end groups, which then is acid catalyzed in aqueous medium to form the corresponding hydroxypropyl polydimethylsiloxane for reaction with isocyanatoethyl methacrylate to form the product bis(urethane methacrylate). The application discloses the preparation of the silicon hydride-terminated polydimethylsiloxane starting material for this synthesis, with molecular weights of 1650 and 2090, by reaction of octamethylcyclotetrasiloxane and tetramethyldisiloxane in sulfuric acid medium.

SUMMARY OF THE INVENTION

In one aspect, the present invention relates to a compound comprising the reaction product of:

(a) a polysiloxane carbinol of the formula wherein:

each R independently is $C_1-C_8$ alkyl, $C_3-C_6$ cycloalkyl, or phenyl; each R' independently is linear $C_4-C_{20}$ alkylene; and x = 50–700;

(b) a polyisocyanate; and (c) a polyfunctional compound having at least one functional group which is reactive with an isocyanate group of the polyisocyanate and after reaction therewith provides an ethylenic functional group in the reaction product;

wherein the polysiloxane carbinol has a molecular weight of from about 5,000 to about 50,000.

Another aspect of the invention relates to a compound as described above wherein the polysiloxane carbinol is a reaction product of the corresponding hydride-terminated polysiloxane and a linear $C_4-C_{20}$ω-alkenyl alcohol.

Another aspect of the invention relates to a compound as described above, wherein the hydride-terminated polysiloxane is a reaction product of: (i) the corresponding silanol of molecular weight at least about 10,000 and a hydridosilane having one or more hydrolyzable groups attached to the silicon atom, or (ii) a cyclosiloxane and a 1,3-dihydrido disiloxane.

A further aspect of the present invention relates to substrates, including at least one surface of a material selected from (i) glass, (ii) polymers of ethylenically unsaturated monomers, and (iii) copolymers of ethylenically unsaturated monomers, bonded to one another by a composition comprising the polymerization product of a compound as described above.

In another aspect, the present invention relates to a method of making a compound polymerizable under elevated temperature and/or actinic radiation exposure conditions, comprising:

(a) reacting a hydride-terminated polysiloxane with a linear $C_4-C_{20}$ω-alkenyl alcohol to form a polysiloxane carbinol of molecular weight of from about 5,000 to about 50,000 with terminal R'OH groups wherein R' is linear $C_4-C_{20}$ alkylene; and (b) reacting the polysiloxane carbinol with a polyisocyanate and a polyfunctional compound having at least one functional group which is reactive with an isocyanato group of the polyisocyanate and after reaction therewith provides an ethylenic functional group in the reaction product.

Another aspect of the invention relates to a method as described above wherein the hydride-terminated polysiloxane is formed by reacting (i) a silanol of molecular weight at least about 10,000 and a hydridosilane having one or more hydrolyzable groups attached to the silicon atom, or (ii) a cyclosiloxane and a 1,3-dihydrido disiloxane.

Other aspects of the invention relate to a method as described above wherein the reaction of step (b) is carried out in the presence of isobornyl methacrylate in an amount of 5–40 percent by weight, based on the weight of the polysiloxane carbinol, and to carrying out the above-described method under substantially anhydrous conditions.

A further aspect of the invention relates to a method of bonding substrates including at least one bonding surface of a material selected from (i) glass, (ii) polymers of ethylenically unsaturated monomers, and (iii) copolymers of ethylenically unsaturated monomers, comprising applying to one of the substrates a composition comprising the abovedescribed compound, placing the substrates in bonding relationship to one another, and exposing the composition to elevated temperature and/or actinic radiation for sufficient time to cure the same and thereby bond the substrates to one another.

In another aspect, the present invention relates to a method as described in the preceding paragraph, wherein the curing step is carried out at least partially under anoxic conditions, e.g., in a gaseous environment consisting essentially of nitrogen.

In a still further bonding method aspect of the invention, which is particularly advantageous for bonding substrate surfaces of polyethylene, especially low density polyethylene, the substrates placed in bonding relationship to one another for bonding by the aforementioned composition are disposed in a curing zone, vacuum is established in the curing zone, the vacuum is broken with a gas consisting essentially of nitrogen, and the elevated temperature and/or actinic radiation curing step is carried out under such gas conditions in the curing zone.

DETAILED DESCRIPTION OF THE PREFERRED EMBODIMENTS

The compounds of the present invention are formed as reaction products of:

(a) a polysiloxane carbinol of the formula wherein: each R independently is $C_1$–$C_8$ alkyl, $C_3$–$C_6$ cycloalkyl, or phenyl; each R' independently is linear $C_4$–$C_{20}$ alkylene; and x=50–700;

(b) a polyisocyanate; and (c) a polyfunctional compound having at least one functional group which is reactive with an isocyanate group of the polyisocyanate and after reaction therewith provides an ethylenic functional group in the reaction product;

wherein the polysiloxane carbinol has a molecular weight of from about 5,000 to about 50,000.

As used herein, the term "polysiloxane urethane" refers to the reaction product of the present invention, obtained by reacting such polysiloxane carbinol, polyisocyanate and polyfunctional compound components with one another.

Preferred polysiloxane carbinols useful in forming the polysiloxane urethane compounds of the invention are those in which R is methyl, i.e., polydimethylsiloxanes. For such compounds, the number, x, of siloxane repeating units, as indicated above may be from 50 to 700, and preferably from 50 to 400.

In the R'OH end groups of the polysiloxane carbinol, each R' moiety is linear $C_4C_{20}$ alkylene. It is a critical feature of the present invention that the carbon number of the linear alkylene in each such end group be from 4 to 20. At lower carbon numbers, below 4, the resulting siloxane urethane reaction products tend to be unstable upon aging, particularly under elevated temperature conditions. While I do not wish to be bound by any theory as regards such instability, it is possible that same may be due to beta-rearrangement in the siloxane urethane molecule at elevated temperature, resulting in elimination of the siloxane moiety from the molecule. Regardless of the specific mechanism, however, reaction products of polysiloxane carbinols having a carbon number for R' of less than 4 exhibit poor heat stability, losing significant adhesive strength in applications where such compounds are used in bonding compositions. By contrast, the polysiloxane carbinols utilized to form the reaction product compounds of the present invention, wherein R' is linear $C_4$–$C_{20}$ alkylene, show excellent heat stability and high adhesive strength even after aging at elevated temperature conditions. Such thermal stability characteristic for the reaction product compounds of the present invention is highly important in applications where the reaction product compound is polymerized by exposure to elevated temperature and/or actinic radiation cure conditions, particularly ultraviolet (UV) cure conditions, which generate substantial internal heat in the coated substrate and raise its temperature to levels which thermolytically degrade the $C_1$–$C_3$ alkylene compounds.

On the other hand, the carbon number of the linear alkylene chain, R', should not exceed 20, for the reason that at higher carbon numbers, the formation of the polysiloxane carbinol becomes disadvantageously difficult, due to increasing incompatibility of the siloxane and alkylene moiety starting materials with one another. In other words, for longer (>$C_{20}$) alkylene chains, the unsaturated precursor of such portion of the molecule (an $\omega$-alkenyl alcohol, as discussed more fully hereinafter) becomes incompatible with the siloxane reactant.

Another feature of the R' alkylene chains in the R'OH terminal groups of the polysiloxane carbinol and the resulting polysiloxane urethane compound is that such chains contain no oxygen atoms, such as in the form of ethoxy or other alkoxy or oxalkylene repeating groups or linkages, as utilized in prior art polysiloxane urethane compounds. This is particularly important in the use of the polysiloxane urethane compounds of the present invention as adhesives and coatings on polymeric substrates, e.g., substrate surfaces formed of ethylenic polymers/copolymers, such as polyethylene.

Although the prior art teaches the general equivalence of alkylene chains to alkoxy or oxalkylene chains in silicone carbinols for forming polysiloxane urethane compounds (see, for example, the aforementioned Canadian Pat. No. 4,134,984, which at pages 3-4 thereof teaches that silicone carbinols useful for forming acrylated urethane silicone compositions may contain alkylene chains or alternatively chains containing hydroxyalkoxy groups; also UK Patent Application No. 2, 110,702A, discussed hereinabove, which at page 7 teaches the use of polysiloxane moieties containing alkylene chains or "polyoxyalkylene group[s] having 4 to 80 carbon atoms and 1 to 40 oxygen atoms"), I have found that polysiloxane urethane compounds derived from polysiloxane carbinol compounds utilizing oxygen-containing alkylene linkages, due to their highly polar character, are poorly wetting on glass and polymeric substrates, particularly polyethylene. Such poor wetting behavior renders the oxygen-containing alkylene polysiloxane urethane compounds ineffective and generally useless for high strength bonding applications and coatings involving glass or polymeric substrates.

In preferred practice, the terminal R' alkylene groups in the compounds of the present invention are linear $C_4$–$C_{16}$ alkylene; most preferably, R' is linear $C_{11}$ alkylene. It will be appreciated that when the compounds in the present invention are utilized as components of adhesive or coating formulations or otherwise as components of a composition, that the carbon numbers of the R' groups in the component may vary within the aforementioned $C_4$–$C_{20}$ range to yield an average carbon number within such range for the composition as a whole.

It is another essential feature of the polysiloxane carbinol utilized in the present invention that same have a molecular weight of from about 5,000 to about 50,000 (all molecular weights referred to herein being number average molecular weights). At molecular weight values below about 5,000 and above about 50,000, the tensile strength, tear strength and Shore A hardness of cured polymers formed from the polysiloxane urethane compounds of the invention tend to decrease to levels which are unsuitably low for end-use applications such as coatings and adhesives. Preferred molecular weight values for the polysiloxane carbinol are from about 5,000 to about 30,000, based on the same considerations.

As described hereinafter in greater detail, the polysiloxane carbinols of the present invention may suitably be formed as reaction products of the corresponding hydride-terminated polysiloxanes and linear $C_4$–$C_{20}$ ω-alkenyl alcohols. Such hydride-terminated polysiloxanes in turn may be formed as a reaction product of either: (1) the corresponding silanol and a hydridosilane having one or more hydrolyzable groups attached to the silicon atom, or (ii) a cyclosiloxane and a 1,3-dihydrido disiloxane. When the hydride-terminated polysiloxane is formed by reaction (i) involving the corresponding silanol and a hydrolyzable group-containing hydridosilane, the silanol has a molecular weight of at least about 10,000, since at lower molecular weights, the physical properties, including tensile strength, percent elongation, tear strength, and Shore A hardness, tend to be unsuitably low for the preferred coating and adhesive applications. It therefore will be apparent that when the silanol/hydridosilane reaction is utilized as a precursor for the polysiloxane carbinol, the carbinol will likewise have a molecular weight at least about 10,000, and accordingly, polysiloxane carbinols having a molecular weight below 10,000, i.e., from about 5,000 to about 10,000, will be prepared from hydride-terminated polysiloxanes formed as reaction products of a cyclosiloxane and a 1,3-dihydrido disiloxane.

The polyisocyanate utilized to form the polysiloxane urethane compound of the present invention may be any suitable polyisocyanate having an isocyanato group which is reactive with the carbinol terminal groups of the polysiloxane carbinol to yield a urethane linkage and after such reaction providing at least one other isocyanato group, or urethane moiety derived from such an isocyanato group, for linking the polysiloxane portion of the reaction product to the polyfunctional compound, as described hereinafter. Suitable polyisocyanates thus include di- and tri-isocyanates, such as for example, ethylene diisocyanate, 1,2-diisocyanatopropane, 1,3-diisocyanatopropane, 1,6-diisocyanatohexane, 1,2-diisocyantocyclohexane, 1,3-diisocyantocyclohexane, 1,4-diisocyanatocyclohexane, o-diisocyanatobenzene, m-diisocyanatobenzene, p-diisocyanatobenzene, bis(4-isocyanatocyclohexyl)methane, bis(4-isocyanatophenyl)methane, toluene diisocyanate, 3,3'-dichloro-4,4'-diisocyanatobiphenyl, tris(4-isocyanatophenyl)methane, 1,5-diisocyanatonaphthalene, hydrogenated toluene diisocyanate, 1-isocyanatomethyl-5-isocyanato-1,3,3-trimethylcyclohexane, and 1,3,5-tris(6-isocyanatohexyl)biuret. Also included are polyisocyanates in a blocked form such as phenyl-blocked toluene diisocyanate and phenyl-blocked diisocyanatonaphthalene.

Particularly useful polyisocyanates include toluene diisocyanate (including the various isomers thereof, e.g., 2,4,-TDI and 2,6-TDI as well as mixtures thereof) and urethane prepolymers derived from toluene diisocyanate, such as the reaction product of 2,4-toluene diisocyanate and hydrogenated bisphenol A, i.e., the polyisocyanate The polyisocyanate component by reaction with the polysiloxane carbinol forms an A-B-A block copolymer, wherein the polysiloxane moiety, B, provides a flexible middle segment, while the urethane portions, as well as mixtures thereof, produced by reaction of the isocyanato groups of the polyisocyanate with the terminal hydroxyl functionalities of the polysiloxane carbinol, provide rigid segments in the resulting compound. Such configuration of flexible polysiloxane intermediate segments adjacent to urethane rigid segments provides corresponding micro-domains of rigid and flexible (hard and soft) segments in the compositions containing the polysiloxane urethane compounds, the rigid micro-domains providing strength and the flexible micro-domains providing toughness, with the combination of such micro-domains providing a high level of adhesive strength in the compositions formed from such compounds.

The polyfunctional compound which is utilized to form the polysiloxane urethane compound of the invention has at least one functional group which is reactive with an isocyanato group of the polyisocyanate and after reaction therewith provides an ethylenic functional group in the reaction product. Such a compound may suitably be a hydroxy-containing (meth)acrylic compound, such as (meth)acrylic acid or a hydroxy-containing (meth)acrylic ester. Preferred compounds include the hydroxy-containing (meth)acrylic esters such as 2-hydroxyethyl acrylate, 2-hydroxyethyl methacrylate, 2-hydroxypropyl acrylate, 2-hydroxypropyl methacrylate, 3-hydroxypropyl acrylate and 3-hydroxypropyl methacrylate.

As used herein, the terms "(meth)acrylic" and "(meth)acrylate" are intended to be broadly construed as including acrylic as well as methacrylic compounds, e.g., acrylic esters and methacrylic esters.

The polysiloxane urethane compounds of the invention are formed by reaction of the polysiloxane carbinol, polyisocyanate and polyfunctional compounds with one another to yield a reaction product in which the polysiloxane moiety is linked by a polyisocyanate-derived diurethane bridging group to the residue of the polyfunctional compound, which as indicated provides an ethylenic functional group in the reaction product. Due to the fact that the polysiloxane carbinol has terminal carbinol groups at both ends of the polysiloxane chain, the reaction product may for example comprise a poly(siloxane) $\alpha,\omega$-bis[diurethane(meth)acrylate], if a hydroxy-containing (meth)acrylic ester is utilized as the polyfunctional compound. Other poly(siloxane) $\alpha,\omega$-bis(urethane) compounds analogously may be formed using other polyfunctional compounds, e.g., epoxides such as butyl glycidyl ether, diglycidyl ether of propylene glycol, diglycidyl ether of butanediol, vinylcyclohexene dioxide, and the like.

The polysiloxane carbinol compounds utilized to form the polysiloxane urethane reaction products of the invention have a molecular weight of from about 5,000 to about 50,000, preferably from about 5,000 to about 30,000, and are in turn suitably formed as reaction products of the corresponding hydride-terminated polysiloxane and a linear $C_4$–$C_{20}$ $\omega$-alkenyl alcohol. Such carbinol-forming hydrosilation reaction may be carried out in the presence of a suitable catalyst such as for example chloroplatinic acid. In such fashion, the $\omega$-alkenyl alcohol provides the linear $C_4$–$C_{20}$ alkylene chain in the polysiloxane carbinol. As indicated hereinabove, the carbon number of the preferred alkylene chains in the product polysiloxane carbinol is from 4 to 16 and accordingly the corresponding linear $C_4$–$C_{16}$ $\omega$-alkenyl alcohols are preferred as reactants for the hydrosilation reaction, with $\omega$-undecylenic alcohol being most preferred to yield the corresponding $C_{11}$ alkylene chain-containing polysiloxane carbinol.

The hydride-terminated polysiloxane utilized in the hydrosilation reaction is advantageously prepared as a reaction product of either: (i) the corresponding silanol of molecular weight at least about 10,000 and a hydridosilane having one or more hydrolyzable groups attached to the silicon atom, or (ii) a cyclosiloxane and a 1,3-dihydrido disiloxane.

When the hydride-terminated polysiloxane is produced by reaction of the corresponding silanol and a hydrolyzable group-containing hydridosilane, the hydridosilane has one or more hydrolyzable groups attached to the silicon atom, such as for example halo, alkoxy, acetoxy or oxime substituents, it being understood that when more than one such hydrolyzable group is present, each may be the same as, or different from, the other(s). Particularly useful hydridosilanes include the halo hydridosilanes such as dialkyl halosilanes, wherein the alkyl substituents on the silicon atom are $C_1$–$C_8$ alkyl, preferably methyl, and the halo substituent on the silicon atom is preferably chloro, i.e., dimethylchlorosiloxane. This reaction of the silanol with the halo hydridosilane is suitably carried out in the presence of pyridine.

It is a particular feture of the present invention that the silanols used for the aforementioned synthesis of the hydride-terminated polysiloxane be of high molecular weight, at least about 10,000, to insure the presence of a polysiloxy backbone providing a substantial soft segment in the polysiloxane urethane compound. Such soft segments, as indicated, provide flexibility and toughness in the polymerized compositions formed from the polysiloxane urethane compounds. Thus, the silanol desirably has a molecular weight (number average molecular weight) of at least 10,000, with suitable ranges generally being on the order of from about 10,000 to about 50,000, preferably from about 10,000 to about 40,000, and most preferably from about 12,000 to about 30,000. In general, if the silanol has a molecular weight below about 10,000, the tensile strength, tear strength, hardness (Shore A) and elongation characteristics of the compositions formed by polymerization of the product polysiloxane urethane compounds are markedly inferior to compositions derived from silanols having moleculare weight of at least 10,000. On the other hand, excessively high molecular weights, e.g., generally above about 50,000, result in reduction of these same performance and physical characteristics to levels which are unsatisfactory for many applications, e.g., uses in coatings and adhesives.

When the hydride-terminated polysiloxane alternatively is formed as a reaction product of a cyclosiloxane and a 1,3-dihydrido disiloxane, it is also required, for the same general reasons as set forth above in respect of the silanols utilized in the hydrosilation formation of the hydride-terminated polysiloxane, to provide high molecular weight reaction products. Thus, the hydride-terminated polysiloxane formed by the reaction of the cyclosiloxane and the 1,3-dihydrido disiloxane should have a molecular weight of from about 5,000 to about 50,000, and preferably from about 10,000 to about 30,000.

A suitable cyclosiloxane reactant is octamethylcyclotetrasiloxane, and a suitable 1,3-dihydrido disiloxane is tetramethyldisiloxane. Such cyclic siloxane and disiloxane compounds react with one another under acid catalyzed conditions to form the hydride-terminated siloxane compounds by equilibrium polymerization.

Preferred polysiloxane urethane reaction products of the present invention include poly(siloxane) $\alpha,\omega$-bis[diurethane(meth)acrylates] of the formula:

wherein:
n is 4–20;
x is 50–700;
U is a urethane linkage, —NHCOO—; and
A is a residue of the polyisocyanate.
Preferably, A is either i.e., a residue of toluene diisocyanate, or a residue of a prepolymer of toluene diisocyanate and hydrogenated bisphenol A, respectively, and n is preferably 11.

The polysiloxane urethane compounds of the present invention may be utilized alone or in admixture with other components, as compositions curable via polymerization by exposure to elevated temperature and/or actinic radiation. Elevated temperature cure may be at temperatures on the order of from about 50° C. to about 120° C. and in such thermal cure compositions, suitable curing catalysts, e.g., copper dinaphthanate, dibutyltin dilaurate, and the like may be employed, as well as polymerization initiators and promoters, e.g., initiators such as cumene hydroperoxide, and promoters (accelerators) including dialkyl-toluidine compounds such as diethyl-p-toluidine and dimethyl-o-toluidine. The concentration of such initiators and/or promoters in the composition may be from about 0.1 to 10 percent by weight, preferably from 0.5 to 5 percent by weight based on the weight of the polysiloxane urethane compound present.

When the curing conditions include exposure to actinic radiation, the curable compositions comprising polysiloxane urethane compounds according to the invention may likewise contain polymerization initiators and/or promoters as described above.

As used herein, actinic radiaation is intended to mean electromagnetic radiation having a wavelength of 700 nm or less which is capable of producing, either directly or indirectly, free radicals capable of initiating additional polymerization of the polysiloxane urethane compounds. The specific actinic radiation employed may include ultraviolet light, or high energy radiation such as gamma-ray, alpha-particle, beta-particle, or electron beams. Preferred actinic radiation is ultraviolet light, i.e., electromagnetic radiation with a wavelength of about 180–400 nm. If ultraviolet light is utilized as a curing condition, the composition preferably contains a photoinitiator, e.g., benzophenone, acetophenone, benzaldehyde, or the like, suitably in a concentration of up to 10 percent by weight and preferably from about 0.5 to 5 percent by weight, based on the weight of the polysiloxane urethane present.

As indicated, a curing catalyst, such as dibutyltin dilaurate, stannous octoate, triethylenediamine or other catalyst may be utilized, to form the polysiloxane urethane reaction product from the polysiloxane carbinol, polyisocyanate and polyfunctional compound reactants. The catalyst, if present, is suitably at a concentration of from about 0.01 up to 1 percent by weight, and preferably from about 0.05 to 0.2 percent by weight, based on total weight of the reaction mixture.

The polysiloxane urethane compound may, as indicated, be utilized singly or in admixture with other components, in curable compositions. Such compositions may contain any conventional additives for the desired end-use application, e.g., as coatings, adhesives, sealants, etc. Additives which may be useful in various applications include pigments, antioxidants, stabilizers, chain extenders, fillers, desiccants, etc.

It is particularly advantageous in many applications to utilize with the polysiloxane urethane compound an ethylenically unsaturated monomer copolymerizable therewith under the aforementioned curing exposure conditions, such monomers serving as reactive diluents for adjustment of the viscosity and modification of the physical properties of the cured material for the specific end-use. Illustrative co-curable reactive diluents include (meth)acrylic acid esters, e.g., methyl methacrylate and various diacrylates, as well as other ethylenically unsaturated copolymerizable monomers such as N-vinylpyrrolidone.

It is important to insure that all reaction steps in the synthesis of the polysiloxane urethane compound are as anhydrous as possible since moisture in the final product may result in premature reaction and gellation, and may itself react with components in the individual synthesis steps, e.g., the polyfunctional compound and the polyisocyanate, thereby lowering the yield of the desired polysiloxane urethane product. The maintenance of anhydrous conditions is particularly important when the hydride-terminated polysiloxane is formed by reaction of the corresponding silanol and a hydridosilane, since failure to insure the substantial absence of moisture in the reaction system will produce incomplete hydride (e.g., in the form of SiH) capping of the silanol and a resultant decrease in the bulk physical properties and performance characteristics of the cured final product. Accordingly, all reagents utilized in the various synthesis steps should be dried in the most efficient manner possible, such as distillation of the ω-alkenyl alcohol and hydroxy-containing (meth)acrylic esters, and drying by either heat and/or vacuum, or with a toluene azeotrope, the silanol reactants.

In a particularly preferred aspect of the present invention, the reaction of the polysiloxane carbinol, polyisocyanate and polyfunctional compound, e.g., a hydroxy-containing (meth)acrylate, is advantageously conducted in the presence of isobornyl methacrylate (IBOMA), suitably present in the reaction system in an amount of about 5 to about 40 percent by weight, preferably from about 10 to about 25 percent by weight, based on the total weight of the reactants. Consistent with the preceding discussion, the isobornyl methacrylate should be substantially anhydrous in character, and preferably is distilled prior to its introduction to the reaction system.

The presence of isobornyl methacrylate in the reaction system, in the above-mentioned amounts, has unexpectedly been found to result in a substantial improvement in physical properties and performance characteristics of the cured product, as described more fully hereinafter. Specifically, tensile and tear strengths, percent elongation, and Shore A hardness of the cured polysiloxane urethane product have been found to be substantially improved by the addition of such quantities of isobornyl methacrylate.

In another preferred aspect of the present invention, when the hydride-terminated polysiloxane used to form the polysiloxane carbinol is in turn formed from the corresponding silanol and a hydridosilane such as dimethylchlorosilane, it is particularly advantageous to utilize the hydridosilane component in excess of the stoichiometric amount required for reaction with the silanol. Suitably the hydridosilane is present in at least 5% excess (relative to the stoichiometrically required amount) and preferably 5-50% excess. Such excess level of hydridosilane in the reaction system has been found to insure proper capping of the silanol by hydride (e.g., in the form of SiH) groups even when residual amounts of water (e.g., on the order of up to about 200 parts per million) are present in the system. It has been found particularly advantageous to utilize a 50% excess of the hydridosilane in combination with proper drying of the reagents as described hereinabove.

Substrates which may usefully be coated and/or bonded to one another by the polysiloxane urethane compositions of the present invention include surfaces of materials such as glass, metals, wood, leather, paper and plastics. Among such surfaces, glass, and polymers of ethylenically unsaturated monomers, and copolymers of ethylenically unsaturated monomers are conventionally difficult to efficiently bond or coat with satisfactory adhesion and other performance properties, particularly substrate surfaces such as polyethylene, polyfluoroalkene polymers and copolymers, e.g., tetrafluoroethylene polymers, tetrafluoroethylene/hexafluoropropylene copolymers, etc., yet all of these materials are coated and/or bonded effectively by polysiloxane urethane compounds of the present invention.

A specifically difficult bonding surface among the foregoing materials, insofar as its amenability to prior art coating and bonding has been concerned, is low density polyethylene (LDPE). With this substrate surface, the polysiloxane urethane compounds of the present invention have been found particularly advantageous, providing high adhesive strength for LDPE surfaces bonded by the cured compounds, especially relative to polysiloxane urethane (meth)acrylate compounds of the prior art utilizing alkoxy chains rather than the linear $C_4-C_{20}$ alkylene chains of the compounds of the present invention.

A preferred embodiment of the present invention relates to a method for bonding substrates including at least one surface of LDPE by UV radiation cure of polysiloxane urethane bonding compositions of the present invention. The substrates, to at least one bonding surface of which has been applied the polysiloxane urethane compound or a bonding composition containing same, are placed in bonding relationship to one another and cured at least partially in an anoxic, i.e., substantially oxygen-free, environment, by exposure to actinic radiation such as UV light. Preferably the substrates to which the polysiloxane urethane compound or composition has been applied are fully cured under such anoxic conditions. In a particularly advantageous embodiment of such anoxic cure, the substrates to which the polysiloxane urethane compound or composition has been applied are disposed in a curing zone which then is evacuated to low vacuum conditions, e.g., on the order of 0.1 to 10 Torr, following which vacuum is broken by introduction of nitrogen gas (i.e., gas consisting essentially of nitrogen and substantially devoid of oxygen or other oxidizing constituents) into the curing zone and the substrates are bonded under UV cure conditions in the nitrogen gas atmosphere. The imposition of vacuum prior to introduction of the nitrogen gas into the curing zone serves to effectively de-gas the polysiloxane urethane bonding medium as well as the LDPE substrate, which is highly oxygen permeable in character. The nitrogen gas atmosphere in the curing zone may be at any suitable pressure, either atmospheric, or below or above atmospheric pressure.

The features and advantages of the present invention are more fully shown with respect to the illustrative Examples hereinafter set forth, wherein all parts and percentages are by weight, unless otherwise expressly stated.

EXAMPLE I

Synthesis of Hydride-Terminated Polysiloxane by Condensation Reaction

A dry, two-liter reaction flask was charged with a pre-dried silanol, Rhone-Poulenc 48V750 (1300 gm, 200 meq of OH) and pyridine (17.4 gm, 220 mmol) under nitrogen blanket, and the resulting solution was heated to 60°-65° C. Chlorodimethylsilane (20.7 gm, 220 mmol) was added over a ten minute period and the reaction mixture was stirred for 3 hours with heating to maintain the aforementioned temperature. Methanol (5 ml) was added to react any excess chlorosilane and the reaction mass was stirred for 30 minutes while cooling at room temperature. The reaction mass then was filtered through Fuller's earth/Celite ($\frac{1}{4}$ mixture). Volatiles were removed from the filtered product at 150°-155° C. for 3 hours at a pressure of 10 mm Hg with a nitrogen capillary bleed. Yield obtained was 1114.0 gm (85%). Spectral data (IR/NMR/GPC) were consistent with the desired hydride-terminated polysiloxane product.

EXAMPLE II

Synthesis of Hydroxyalkylsilicone Polymer

A dry, three-liter reaction flask was charged with pre-dried polymer obtained in Example I having a molecular weight of 12,000 (1,000 gm, 142 meq of Si-H), distilled undecylenic alcohol (24.3 gm, 143 mmol), and 2% chloroplatinic acid in butyl acetate (2.0 gm, 10 ppm Pt), and a small sample was removed for infra red analysis. The solution was heated to 60°-65° C. and after two hours, IR analysis showed the reaction to be complete (evidenced by the loss of any Si-H absorption peak). Volatile components were removed from the reaction mass under reduced pressure conditions and the product was vacuum dried for one hour at 50° C. and 0.5 mm Hg pressure. Yield was 981.0 gm (96%) and spectral data (IR/NMR/GPC) were consistent with the desired polysiloxane carbinol product.

EXAMPLE III

Synthesis of Silicone-Urethane-Methacrylate Product

The polysiloxane carbinol obtained in Example II (950 gm, 118 meq of $C_{11}H_{23}OH$) was vacuum dired at 100° C. for ninety minutes at 0.5 mm Hg pressure just prior to use. A dry two-liter resin kettle was charged with distilled isobornyl methacrylate (238.4 gm), dibutyltin dilaurate (0.2 gm), 2% benzoquinone in polyethylene glycol methacrylate (4 gm) and toluene diisocyanate (21.6 gm, 124 mmol) under nitrogen blanket and the resulting solution was heated to 60°-65° C. The polysiloxane carbinol was added over a 2 hour period through a powder addition funnel. After stirring an additional thirty minutes, a sample was taken for determination of percent-NCO in the reaction mass; the theoretical value was 0.42% and the actual value was 0.56%. Hydroxypropyl methacrylate (17.9 gm, 124 mmol) was added and the reaction mixture was stirred an additional 4 hours. A determination of percent-NCO revealed the presence of 0.16%-NCO after that time. Heating then was discontinued and the reaction mass was cooled overnight with stirring to minimize any molecular rearrangement of the product. A yield of 1116.5 gm (91%) was obtained, and the IR spectra were consistent with the desired polysiloxane-urethane-methacrylate compound.

EXAMPLE IV

Synthesis of Hydride-Terminated Polysiloxane By Equilibrium Polymerization A dry, three liter reaction flask was charged with octamethylcyclotetrasiloxane (1580 g, 5.07 mole) under nitrogen and was heated to reflux. Approximately 80 ml of octamethylcyclotetrasiloxane was collected through a Dean-Stark trap to remove traces of water. The octamethylcyclotetrasiloxane was cooled to 50° C. and carbon black (8.5 g), concentrated sulfuric acid (1.7 g), and tetramethyldisiloxane (16.8 g, 0.125 moles) were added. The reaction mass was then heated to 60°-65° C. for four hours, and the temperature increased to 100°-105° C. for 18 hours. Fuller's Earth/Celite (¼ mixture, 5 g) was added to the mixture. After stirring overnight at room temperature, the crude product was filtered through Fuller's Earth/Celite (¼ mixture), and volatiles were removed at 150°-155° C. for four hours and 4.0 mm/Hg with a nitrogen capillary bleed. Yield was 1409.0 g (82%). Spectral data (NMR/IR/GPC) were consistent with the desired product.

The reaction product had a molecular weight of 12,000 (0.142 meq SiH). A silicone carbinol and a silicone-urethane-methacrylate were synthesized by the same procedures as described in Examples II and III.

EXAMPLE V

To obtain a polysiloxane urethane (meth)acrylate compound having longer urethane segments than the reaction product obtained by the procedure of Example III, wherein toluene diisocyanate alone was utilized as the polyisocyanate, hydrogenated bisphenol A (14.6 gm) was reacted with toluene diisocyanate (21.6 gm) at a temperature of 95° C. for a period of 1 hour, to yield the diurethane diisocyanate compound shown below in a quantitative yield.

This diurethane diisocyanate compound then was reacted with the hydroxyalkyl silicone polymer formed by the procedure of Example II (650 gm), followed by final capping with hydroxypropyl methacrylate, added to the reaction system in an amount of 17.9 gm.

The foregoing synthesis was carried out in various solvent media including toluene and diglyme under substantially anhydrous conditions and with stoichiometric amounts of reactants present. In all cases, the polysiloxane urethane (meth)acrylate compound was opaque, being milky white in color when the reaction was complete. This is believed due to trace amounts in the reaction system of organic urethanes, which are completely insoluble in polysiloxanes.

EXAMPLE VI

Samples of polysiloxane urethane methacrylate compounds were prepared by the procedures of Example IV (Samples 1-3) and Examples I-III (Samples 4-7). Included for comparison purposes in this test was an organic resin control (Sample 8) which was made using a hydroxy-terminated polyethylene oxide (PEO) polymer with a molecular weight of 2400 as the flexible segment of a corresponding urethane acrylate compound.

The respective Samples 1-7 had varying molecular weights, which were classified as either low (designating a molecular weight of about 5000), medium (designating a molecular weight of about 12,000) or high (designating a molecular weight of about 28,000). In Samples 1-3, such molecular weight designations refer to the molecular weight of the hydride-terminated silicone which is utilized as a reactant with undecylenic alcohol to form the hydroxyalkyl silicone polymer which then is reacted with the diisocyanate and methacrylate materials to form the product polysiloxane urethane methacrylate compound. For Samples 4-7, the molecular weight designations refer to the silanol starting material. The higher molecular weight silanol used to prepare Sample 7 was Rhone-Poulenc 48V3500 silanol, having a viscosity of 3500 centipoise and a molecular weight of about 28,000.

Each of the respective samples was formed into a film of 60 mils thickness and cured by exposure to ultraviolet (UV) light at a radiation intensity of 70 watts/cm², at an exposure time of one minute per side of the sample, with the exception of Sample 6, which was formulated analogously to Sample 5, but cured under UV exposure conditions for two minutes per side of the sample.

Testing specimens were cut from the cured films with appropriate dies, for tensile strength, tear strength and elongation testing in accordance with the procedures of ASTM Testing Methods No. D-412 and D-624.

Results of the testing are shown in TABLE I below.

TABLE I

| Sample | (a) | (b) | (c) | (d) | (e) | (f) |
| --- | --- | --- | --- | --- | --- | --- |
| 1 | E | low | 232 | 40 | 39 | 310 |
| 2 | E | medium | 304 | 44 | 22 | 698 |
| 3 | E | high | 282 | 36 | 15 | 836 |
| 4 | C | low | 42 | 8 | 15 | 206 |
| 5 | C | medium | 559 | 88 | 55 | 511 |
| 6 | C | medium | 836 | 143 | 56 | 345 |
| 7 | C | high | 316 | 40 | 24 | 690 |
| 8 | ORGANIC CONTROL | | 1475 | 226 | 86 | 125 |

(a) Method of Forming SiH Polymer, wherein:
E = equilibrium polymerization of hydride-terminated silicone, by reaction of octamethylcyclotetra siloxane and tetramethyl disiloxane
C = formation of hydride-terminated silicone by condensation reaction of a hydroxy-terminated silanol with dimethylchlorosilane
(b) Molecular Weight
(c) Tensile Strngth, psi
(d) Tear Strength, pli
(e) Shore A Hardness
(f) Percent Elongation As shown by the data in TABLE I, the polysiloxane urethane methacrylate compounds formed from the medium molecular weight silanol (Rhone-Poulenc 48V750 silanol, having a viscosity of 750 centipoise and a molecular weight of about 12,000) exhibited the best properties (Sample 6, in the synthesis of which the hydride-terminated silicone was produced by condensation reaction of a hydroxy-terminated silicone and dimethylchlorosilane in accordance with the procedure of Example I). On the other hand, the data for Sample 4, for which the hydride-terminated silicone was formed by the same type condensation reaction, but with a low molecular weight silanol (MW=5,000), included generally low tensile and tear strength, Shore A hardness and percent elongation. For such reason, it is preferred that silanols utilized to form the hydride-terminated silicone by condensation reaction with a hydridosilane have a relatively high molecular weight, of at least 10,000, e.g., in the range of from about 10,000 to about 50,000, preferably from about 10,000 to about 30,000, as previously discussed herein.

By contrast, the low molecular weight silicone of Sample 1, produced by equilibrium polymerization of octimethylcyclotetrasiloxane and tetramethyl disiloxane, had properties which in general were significantly higher than corresponding values for Sample 4. To determine the specific reason for the low tensile, tear, Shore A hardness and elongation valves measured for Sample 4, silanol analysis and vapor phase osmometry molecular weight determination was conducted on this polysiloxane urethane methacrylate reaction product, and this testing showed that the resin was essentially monofunctional. Accordingly, for the formation of hydride-terminated polysiloxanes of low molecular weight, on the order of 5,000–10,000, equilibrium polymerization is the desired synthesis method.

EXAMPLE VII

When the hydride-terminated silicone utilized to form polysiloxane urethane(meth)acrylates according to the present invention is derived by reacting a silanol with dimethylchlorosilane or other halo hydridosilane material, the reactants and reaction conditions should be as anhydrous as possible. As indicated, failure to insure dryness (i.e., substantially moisture free character) in the reaction system will result in incomplete hydride capping of the silanol, with consequent decrease in the bulk physical and adhesive properties of the cured resin product.

Apart from the maintenance of anhydrous conditions, the use of a crosslinking agent, such as hexanediol dimethacrylate, has been found to provide a cured polysiloxane urethane(methyl)acrylate material with increased tensile strength and decreased elongation characteristics.

To evaluate the effect of these variables, a silanol (Rhone-Poulenc 48V750 silanol) was utilized to form a polysiloxane urethane methacrylate in accordance with the general procedure of Examples I–III, except that the reaction products were formed using varying amounts of excess dimethylchlorosilane in the synthesis of the hydride-terminated silicone from such silanol (Samples 9–13); in addition, Samples 12 and 13 utilized hexanediol dimethacrylate as a crosslinker, in an amount of 5 percent by weight, based on the total weight of the hydroxyalkyl silicone in the reaction mixture. Further, to gauge the effect of moisture in the reaction system, Samples 11 and 13 were made in the presence of approximately 200 ppm water in the reaction mixture.

The product silicone urethane polymer in each instance was tested for tensile strength, tear strength, Shore A hardness and percent elongation, according to the same procedures as utilized in Example VI. Results are set forth in TABLE II below.

TABLE II

| Sample | (a) | (b) | (c) | (d) | (e) | (f) | (g) |
| --- | --- | --- | --- | --- | --- | --- | --- |
| 9 | 5 | no | no | 425 | 52 | 49 | 378 |
| 10 | 50 | no | no | 409 | 67 | 46 | 623 |
| 11 | 50 | no | yes | 522 | 73 | 47 | 530 |
| 12 | 50 | yes | no | 471 | 66 | 54 | 261 |
| 13 | 50 | yes | yes | 567· | 75 | 56 | 263 |

(a) Percent Excess Dimethylchlorosilane
(b) Crosslinker (5% hexanediol dimethacrylate)
(c) Dry
(d) Tensile Strength, psi
(e) Tear Strength, pli
(f) Shore A Hardness
(g) Percent Elongation For Sample 9, only a 5% excess of dimethylchlorosilane was utilized and, as shown by the performance properties, this amount was insufficient to properly cap the silanol because of the presence of a residual amount of water (approximately 200 ppm). A 50 percent excess of the chlorosilane (compare Sample 10 with Sample 9) improves the tear strength and percent elongation characteristics of the cured product.

The use of a 50 percent excess of dimethylchlorosilane and proper drying of the reagents, to yield a substantially anhydrous reaction system, resulted in substantial improvement of the tensile strength and tear strength properties for Sample 11, yet Shore A hardness remained approximately the same as for Sample 10 where residual water was present in the reaction system. The percent elongation for Sample 10 was significantly greater than for Sample 11, indicating that a more complete crosslinking had occurred on curing of the latter material, as compared with the former.

The use of a crosslinking agent, hexanediol dimethacrylate, provided significant increases in tensile strength and tear strength relative to the corresponding compositions lacking such crosslinkers (compare Sample 13 with Sample 11, and Sample 12 with Sample 10). Shore A hardness was likewise significantly increased by the use of the crosslinker, while elongation was decreased as a result of the crosslinking reaction.

EXAMPLE VIII

Heat aging studies were conducted on polysiloxane urethane methacrylates formed as in Examples I–III, using as the silanol starting material 48V-750 silanol (Rhone-Poulenc).

Samples were evaluated at room temperature (Samples 14 and 15) as well as at an elevated temperature of 250° F. (Samples 16 and 17). The reaction system was not dried in the case of Samples 15 and 17, whereas the silanol and reagents were properly dried and the silanol was reacted with an excess of chlorosilane in the case of Samples 14 and 16. The respective sample compositions were cured and subjected to determination of tensile and tear strength, Shore A hardness and elongation, in accordance with the same test procedures as in Example VI. Results of the tests are shown in TABLE III below.

TABLE III

| Sample | (a) | (b) | (c) | (d) | (e) | (f) | (g) |
|---|---|---|---|---|---|---|---|
| 14 | 0 | yes | room temp. | 522 | 73 | 47 | 530 |
| 15 | 0 | no | room temp. | 425 | 52 | 49 | 378 |
| 16 | 1 | yes | 250 | 617 | 178 | 58 | 197 |
| 17 | 1 | no | 250 | 321 | 71 | 55 | 194 |

(a) Age, Weeks
(b) Dried
(c) Temperature, Degrees F.
(d) Tensile Strength, psi
(e) Tear Strength, pli
(f) Shore A Hardness
(g) Percent Elongation The foregoing data also evidence the need for effective dryness in the reaction conditions. When the silanol starting material and other reagents are properly dried and the silanol is reacted with an excess of chlorosilane, cured films of the resulting final product polysiloxane urethane methacrylate show high tensile and tear strengths as compared to corresponding systems wherein poorly dried silanols and reagents were utilized.

EXAMPLE IX

Silicone urethane methacrylate samples were made up by the procedure of Examples I–III, utilizing as the silanol starting material a silanol having a viscosity of 750 centipoise and a molecular weight of about 12,000 (Rhone-Poulenc 48V750 silanol). The preparation of all samples included conducting the condensation reaction of silanol and dimethylchlorosilane with a 50 percent excess of dimethylchlorosilane, and the reaction system contained in all cases 20 percent by weight isobornyl methacrylate. Samples 20–23 were prepared from dried reactants, whereas Samples 18 and 19 were prepared in reaction systems containing residual moisture. Samples 19, 21 and 23 utilized 5 percent hexanediol dimethacrylate as a crosslinker in the reaction system. Samples 22 and 23 were heat aged one week at 250° F. prior to forming cured resin films therefrom.

Films prepared from each of the sample silicone urethane methacrylate polymers were made and evaluated for extractables using hexane as an extraction solvent. Results of the test are shown in TABLE IV below.

TABLE IV

| Sample | Treatment | Percent Extractables |
|---|---|---|
| 18 | 50% excess dimethylchlorosiloxane | 24 |
| 19 | same as Sample 18, plus 5% crosslinker[a] | 9 |
| 20 | dried, 50% excess dimethylchlorosilane | 17 |
| 21 | dried, 50% excess dimethylchlorosilane, 5% crosslinker[a] | 10 |
| 22 | same as Sample 19, heat aged one week at 250° F. | 12 |
| 23 | same as Sample 20, heat aged one week at 250° F. | 7 |

[a]crosslinker = hexanediol dimethacrylate

These data evidence the desirability of anhydrous conditions and use of a crosslinker in forming the silicone urethane methacrylate product. As shown, hexane extractables are reduced from 24 percent to 9 percent (compare Samples 18 and 19) by the use of drying and addition of hexanediol dimethacrylate as a crosslinker.

EXAMPLE X

In this test, the effect of varying isobornyl methacrylate concentrations in the reaction mixture forming the silicone urethane methacrylate were evaluated, for reaction products prepared according to the procedure of Examples I–III. Tensile strength, tear strength, Shore A hardness and percent elongation were determined for cured samples of reaction products prepared with varying amounts of isobornyl methacrylate and the results were plotted as FIGS. 1 and 2.

Figure 1:
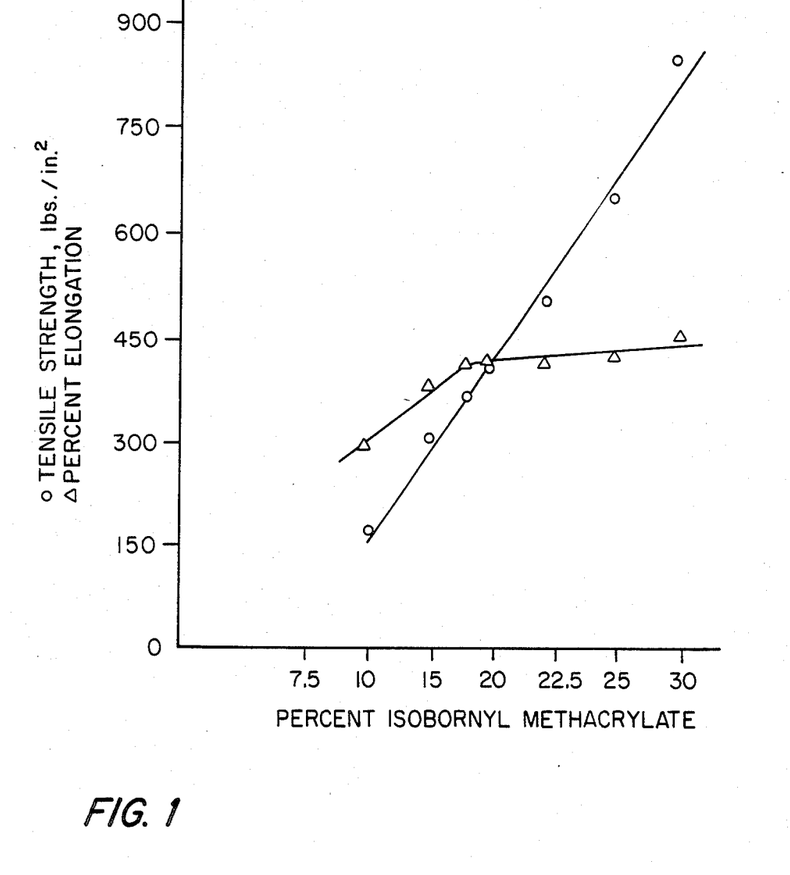
FIG. 1 is a graph showing tensile strength and percent elongation of cured compounds of the present invention, as a function of weight percent isobornyl methacrylate present in the compound-forming reaction of a polysiloxane carbinol, a polyisocyanate and a hydroxy-containing methacrylic ester.
Figure 2:
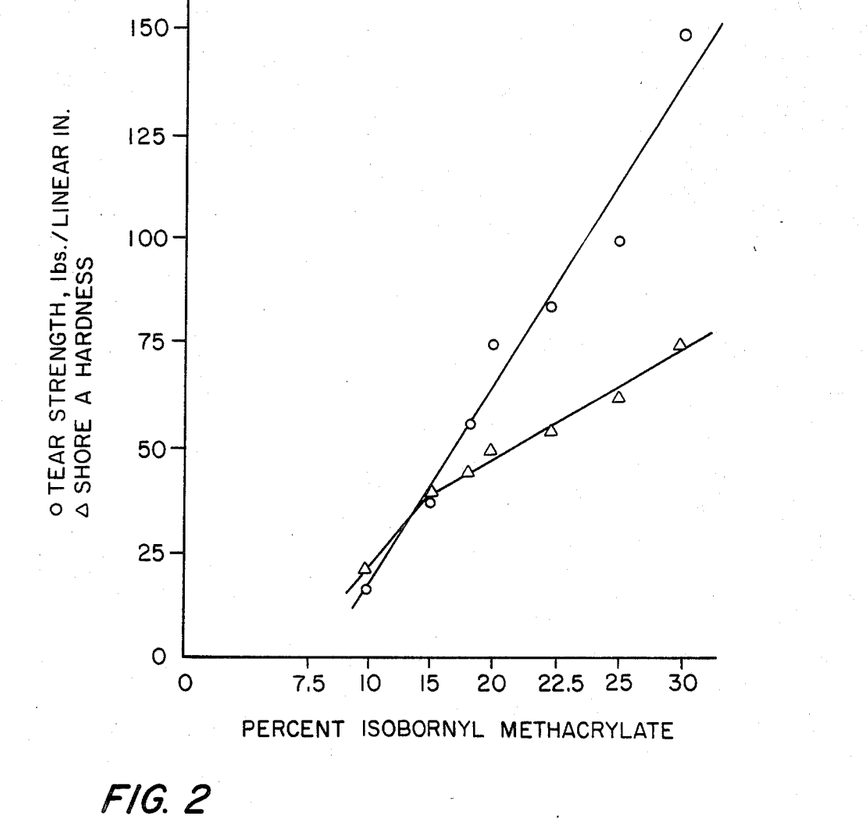
FIG. 2 is a graph of tear strength and Shore A hardness for cured compounds of the present invention, as a function of weight percent isobornyl methacrylate present in the compound-forming reaction of polysiloxane carbinol, polyisocyanate and hydroxy-containing methacrylic ester.

FIG. 1 shows tensile strength and percent elongation as a function of percent isobornyl methacrylate present in the reaction system and FIG. 2 is a plot of tear strength and Shore A hardness as a function of the isobornyl methacrylate concentration.

As shown by these respective graphs, tensile strength and tear strength are each essentially a linear function of the isobornyl methacrylate concentration, over the range studied, whereas percent elongation is a linear function below about 18–20 percent isobornyl methacrylate and reaches a plateau above such value. Shore A hardness is a bi-linear function, with a change of slope in the vicinity of 15 weight percent isobornyl methacrylate.

Based on these data, it is apparent that increasing concentrations of isobornyl methacrylate in the polysiloxane carbinol-isocyanate-(meth)acrylate reaction system increase tensile strength, tear strength and Shore A hardness of the resulting silicone urethane methacrylate compositions, with concentrations on the order of from about 10 percent to about 30 percent and preferably from about 15 to about 30 percent being usefully employed in the reaction system.

EXAMPLE XI

Silicone urethane methacrylate Samples 24 and 25 were prepared in accordance with the procedure of Examples I–III, using as the silanol starting material the same silanol as employed in Example IX. Sample 24 contained no filler, while Sample 25 contained 10 percent by weight fumed silica (Wacker HDK-2000), based on the weight of the silicone urethane methacrylate resin. Results are shown in TABLE V for determinations of tensile strength, tear strength, Shore A hardness and percent elongation for these samples.

TABLE V

| Sample | (a) | (b) | (c) | (d) | (e) |
|---|---|---|---|---|---|
| 24 | None | 409 | 67 | 44 | 623 |
| 25 | Fumed Silica | 554 | 116 | 56 | 535 |

(a) Filler
(b) Tensile Strength, psi
(c) Tear Strength, pli
(d) Shore A Hardness
(e) Percent Elongation As shown by the foregoing data, tensile strength, tear strength and Shore A hardness were significantly increased by addition of the silica filler, while percent elongation decreased from 623 percent (Sample 24) to 535 percent (Sample 25).

The addition of the fumed silica or other filler does increase viscosity of the silicone urethane composition, and this may be desirable in certain applications. On the other hand, if lower viscosity is required for a given application, in formulations where filler is employed, a monomeric reactive diluent may be employed in the silicone-isocyanate-(meth)acrylate reaction system. Thus, by the expedient of adding reinforcing filler or alternatively of adding increased amounts of reactive diluent, the product resin properties may be tailored over a wide range to desired values.

EXAMPLE XII

Samples 26-30 were made up in accordance with the general procedure of Examples I-III, utilizing as the silanol in Sample 26 a medium molecular weight silanol having a viscosity of 750 centipoise and a molecular weight of about 12,000 (Rhone-Poulenc 48V750), and as the silanol in Samples 27-30, a high molecular weight silanol having a viscosity of 3700 centipoise and a molecular weight of approximately 28,000 (Rhone-Poulenc 48V3500). In the ensuing discussion, the medium molecular weight silanol is termed "Silanol A" and the high molecular weight silanol is termed "Silanol B". Further, while Samples 27 and 29 utilized as the diiosocyanate the toluene diisocyanate material specifically described in Example III, Samples 26, 28 and 30 utilized a longer urethane block in the molecule, derived from the reaction product of hydrogenated bisphenol A and toluene diisocyanate, of the formula:

The silicone urethane methacrylate whose urethane moiety was derived solely from toluene diisocyanate is hereinafter termed a "short" urethane block length polymer, whereas the corresponding silicone urethane methacrylate whose urethane moiety was derived from the adduct of hydrogenated bisphenol A and toluene diisocyanate is termed a "long" urethane block length polymer.

In addition to the foregoing, Samples 29 and 30 contained 5 percent hexanediol dimethacrylate as crosslinker, based on the weight of the silicone urethane methacrylate polymer. Physical testing data on the respective Samples 26-30 are set forth in TABLE VI below.

TABLE VI

| Sample | (a) | (b) | (c) | (d) | (e) | (f) |
|---|---|---|---|---|---|---|
| 26 | A | long | 887 | 138 | 53 | 640 |
| 27 | B | short | 421 | 69 | 25 | 1040 |
| 28 | B | long | 105 | 25 | 21 | 420 |
| 29 | B | short | 297 | 33 | 28 | 485 |
| 30 | B | long | 130 | 27 | 31 | 385 |

(a) Silanol
(b) Urethane Block Length
(c) Tensile Strength, psi
(d) Tear Strength, pli
(e) Shore A Hardness
(f) Percent Elongation As shown by the above data, the use of a low molecular weight silanol and provision of a long block length urethane moiety yielded substantially greater physical properties than the reaction product derived from higher molecular weight silanols and provided short urethane block lengths (compare Samples 26 and 27). In general, the use of longer urethane block lengths with the same molecular weight silanol starting material produced significantly reduced physical properties, indicative of increased rigidity of the resultant product polymer.

Samples 31-35 were prepared analogously to Samples 26-30, respectively, except that the former were subjected to heat aging for one week at elevated temperature (250° F.). Physical test data then were determined for the heat aged samples in the same manner as for the non-aged Samples 26-30. Results on the heat aged samples are set out in TABLE VII below.

TABLE VII

| Sample | (a) | (b) | (c) | (d) | (e) | (f) |
|---|---|---|---|---|---|---|
| 31 | A | long | 400 | 85 | 64 | 260 |
| 32 | B | short | 309 | 51 | 35 | 650 |
| 33 | B | long | 122 | 20 | 27 | 520 |
| 34 | B* | short | 301 | 32 | 31 | 400 |
| 35 | B* | long | 116 | 22 | 31 | 410 |

*composition contained 5 percent by weight hexanediol dimethacrylate as a crosslinker
(a) Silanol
(b) Urethane Moiety Block Length
(c) Tensile Strength, psi
(d) Tear Strength, pli
(e) Shore A Hardness
(f) Percent Elongation As shown by the foregoing tabulated data, the heat aged Samples 33-35 exhibited generally the same order of magnitude values for various physical properties as the corresponding unaged Samples 28-30, including samples having long urethane block segments (Samples 28, 30, 33 and 35), as well as the polymers containing short urethane segments in compositions including a crosslinking agent (Samples 29 and 34).

Further, as shown by a comparison of Sample 26 with Sample 31, heat aging of the medium molecular weight silanol-based material resulted in a substantial deterioration of physical properties, while the higher molecular weight polymers containing short urethane segments likewise exhibited deterioration on heat aging, but to a lesser extent.

Comparing the various polymers containing short urethane segments with the corresponding polymers containing long segments, it is seen that the long block resins produce lower physical properties in the cured materials. Further, such long block resins were found to be opaque, which in combination with their reduced physical properties (relative to the short urethane block materials) indicated that the hydroxyalkyl silicone prepolymers formed from the corresponding silanols were not fully capped, despite a careful anhydrous synthesis.

EXAMPLE XIII

Samples 36-38 were made up in accordance with the procedure of Examples I-III, Sample 36 being formed from a hydride-terminated silicone derived from reaction of dimethylchlorosilane and Silanol A (as previously described in Example XII). Sample 37 was formed analogously from Silanol A, however different diisocyanate components were utilized in the silicone diisocyanate methacrylate reaction; Sample 36 utilized a diisocyanate (TDI) which produced a short urethane segment in the product molecule, while Sample 37 was formed from a long segment diisocyanate (adduct of toluene diisocyanate and hydrogenated bisphenol A), and thus contained a long urethane segment in the product polymer.

Sample 38 was produced by the same procedure as Sample 36, except that Silanol B was utilized in place of Silanol A.

Sample 39 was synthesized in the same manner as the reaction product in Example V, but using in place of the silicone a polyether diol having a molecular weight of 2,000. This sample contained a long urethane segment.

Sample 40 utilized as the silanol starting material a hydroxyl-terminated polyethylene oxide/silicon copolymer (Dow Corning Q4-3667).

To each of the above-described resins, was added two percent by weight of a photoinitiator, either diethylacetophenone (DEAP) or Darocure 953 ® photoinitiator. No attempt was made to improve adhesion characteristics by te use of adhesion promoters or other diluents in these sample compositions.

Each of the samples was evaluated for adhesion on various substrates. The uncured resin in each instance was placed between lapshears with a 0.5 inch overlap and was cured under ultraviolet light at an exposure of one minute per side, except in the case of substrates, such as steel or nylon, which are impervious to UV light, and in such instances, the opposing substrate, which was UV light penetrable in all instances, was irradiated for two minutes.

Subsequent to curing, the lapshear samples were tested for adhesive bonding strength in psi, by the procedure of ASTM Test Method No. D-1002.

The data for the various samples are set forth in Table VIII below for various substrate surface combinations of glass, nylon, Valox 420 ® polybutylene terephthalate, aluminum, steel, low density polyethylene (LDPE), high density polyethylene (HDPE), and polypropylene.

TABLE VIIIA[a]

| Sample | (a) | (b) | (c) | (d) | (e) | (f) | (g) | (h) | (i) |
|--------|-----|-----|-----|-----|-----|-----|-----|-----|-----|
| 36 | A | short | 400 | 274 | 172 | 294 | 196 | 56 | 34 |
| | | | (118) | (22) | (22) | (32) | (16) | (6) | (6) |
| 37 | A | long | 372 | 308 | 224 | 312 | 268 | — | 80 |
| | | | (30) | (16) | (10) | (42) | (18) | — | (4) |
| 38 | B | short | 614 | 274 | 206 | 196 | 202 | — | 42 |
| | | | (46) | (40) | (8) | (16) | (8) | — | (10) |
| 39 | * | long | 241 | 450 | 310 | 58 | 86 | 0 | — |
| | | | (93) | (60) | (84) | (30)[b] | (60)[b] | | |
| 40 | (*) | short | 25 | 111 | 95 | — | — | 34 | 0 |
| | | | (8) | (36) | (25) | | | (13) | |

(a) Silanol starting material
(b) Urethane segment length
(c) Glass/glass
(d) Glass/nylon
(e) Glass/Valox 420 ® polybutylene terephthalate
(f) Glass/Al
(g) Glass/steel
(h) LDPE/LDPE
(i) Glass/LDPE
* a polyether diol having a molecular weight of 2,000
(*) Q4-3667 polyethylene oxide/silicon copolymer (Dow Corning)
[a] All values are psi and the numbers in parentheses are standard deviations.
[b] These values are dubious because the specimens snapped apart as soon as tension was applied.

TABLE VIIIB[a]

| Sample | (a) | (b) | (c) | (d) | (e) | (f) | (g) | (h) |
|--------|-----|-----|-----|-----|-----|-----|-----|-----|
| 36 | A | short | 16(6) | 86(14) | 72(14) | 46(6) | 82(18) | 68(22) |
| 37 | A | long | 90(28) | 42(12) | 36(8) | 52(12) | 36(12) | 20(4) |
| 38 | B | short | 48(10) | 42(12) | 6(2) | 30(24) | 10(4) | 12(4) |
| 39 | * | long | — | — | — | 40(26) | 0 | 0 |
| 40 | (*) | short | — | 0 | — | — | — | — |

(a) Silanol
(b) Urethane segment length
(c) Glass/HDPE
(d) LDPE/steel
(e) LDPE/aluminum
(f) Glass/polypropylene
(g) LDPE/nylon
(h) LDPE/Valox 420 ® polybutylene terephthalate
* a polyether diol having a molecular weight of 2,000
(*) Q4-3667 polyethylene oxide/silicon copolymer (Dow Corning)
[a] All values are psi and the numbers in parentheses are standard deviations.

As shown by the data in TABLE VIIIA and TABLE VIIIB, the cured compositions of the present invention (Samples 36-38) demonstrated substantially improved bonding adhesion of various substrates, specifically glass/glass; glass/nylon; glass/Valox 420 ® polybutylene terephthalate; glass/LDPE; and LDPE/steel, relative to the cured compositions based on the hydroxyl-terminated polyethylene oxide/silicone polymer which the prior art has generally taught as equivalent to hydroxyalkyl silicones. Despite this teaching in the art, the results shown in TABLES VIIIA/B demonstrate surprising and unexpected improvement in adhesion for the compositions of the present invention.

Further, the cured compositions of the present invention exhibited substantially improved adhesion over the polyether diol-based resin (Sample 39) for glass/glass; LDPE/nylon and LDPE/Valox 420 ® polybutylene terephthalate.

Cured compositions of the present invention based on Silanol A as a starting material were found to be particularly effective for bonding of substrates including low density polyethylene, as compared to the polyether diol-based resin samples and the samples based on the polyethylene oxide/silicone copolymer (Samples 39 and 40, respectively). By way of example, the bonding of low density polyethylene (LDPE) to itself using the cured composition of Sample 36, yielded an adhesion level of 56 psi, while the corresponding polyether diol-based resin (Sample 39) gave an adhesion level of 0 psi, and the polyethylene oxide/silicone copolymer-based material (Sample 40) gave an adhesion level of 34 psi. This is highly significant in view of the extreme difficulty which has heretofore been encountered in bonding substrates including polyethylene surfaces, particularly low density polyethylene surfaces, which have particularly low surface energy levels disfavorable to bonding.

EXAMPLE XIV

Heat cure formulations of various silicone urethane methacrylate polymers were blended, of the following formula:

9.6 gm silicone urethane methyacrylate polymer
0.12 gm diethyl-p-toluidine
0.06 gm dimethyl-o-toluidine
0.01 gm $Cu(naph)_2$
0.20 gm cumene hydroperoxide.

In this formulation, the copper dinaphthanate functioned as a heat cure cataylst, while the cumene hydroperoxide served as an initiator and the diethyl-p-toluidine and dimethyl-o-toluidine functioned as a polymerization accelerator.

Sample 41 utilized as the polymer a material based on Silanol A, prepared in accordance with the procedure of Examples I–III. This sample contained a short urethane segment. Sample 42 had a long urethane segment, but was otherwise prepared in the same manner as Sample 41. Sample 43 was formulated using as the silicone starting material a hydroxyl-terminated polyethylene oxide/silicone copolymer (Q4-3667, commercially available from Dow Corning); this sample had a short urethane segment.

The respective samples were placed between two lap shear substrates with a 0.50 inch overlap (zero gap). The samples then were clamped and cured overnight at 200° F. Adhesion tests were carried out in the same manner as described in Example XIII, yielding the results shown in TABLE IX below.

TABLE IX[a]

| Sample | Glass/glass | Glass/steel | Steel/steel |
|---|---|---|---|
| 41 | 726(118) | 326(8) | 218(30) |
| 42 | 224(104) | 208(12) | 178(16) |
| 43 | — | — | 550(29) |

[a]All values are psi and the numbers in parentheses are standard deviations.

The foregoing data show the effect of urethane segment length in the compositions of the present invention, when glass is employed as a constituent bonding substrate. The silicone urethane methacrylate polymer having a short urethane segment length (Sample 41) gave a significantly higher adhesion level than the corresponding sample having a long urethane segment length (Sample 42). The single polyethylene oxide/silicone copolymer formulation (Sample 43) provided an adhesion level for self-bonding of steel that was significantly higher than that achieved by the Sample 41 and 42 formulations.

EXAMPLE XV

In this test, various silicone-urethane-methacrylate compositions of the present invention were evaluated against the same formulation utilized in Sample 43 (Sample 47) and the same polyether diol-based resin composition utilized in Sample 39 (Sample 48). The silicone-urethane-methacrylate compositions of the present invention included a polymer having a short urethane segment and formulated by condensation reaction from the same silanol as utilized in Sample 41 (Sample 44). Sample 45 was formed by condensation from the same silanol as Sample 44, but with a long urethane segment. Sample 46 utilized the same composition as Sample 38 and had a short urethane segment.

Torque tests were performed for each of the cured compositions of Samples 44–48. Aluminum hex buttons were bonded to 3"×3" glass substrates and cured under ultraviolet radiation for a two minute exposure period. The aluminum hex button in each case then was removed with a torque wrench, and the torque, in inch-lbs., required for removal, was determined. The results are shown in TABLE X below.

TABLE X

| Sample | Torque(in-lbs)[a] |
|---|---|
| 44 | 98(8) |
| 45 | 88(10) |
| 46 | 75(5) |
| 47 | 116(5) |
| 48 | 23(6)[b] |

[a]The numbers in parentheses are standard deviations.
[b]The torque value given is in ft-lbs.

The foregoing data show that cured compositions based on silicone urethane methacrylate polymers according to the present invention provide adhesion levels, as reflected by the torque removal values, which are of the same general magnitude as those achieved by the cured composition based on the polyethylene oxide/silicone copolymer (Sample 47). Among the samples representative of the present invention, Samples 44–46, the best performance was achieved with a polymer having a short urethane segment and based on the medium molecular weight silanol (Sample 44), while the corresponding formulation having a long urethane segment (Sample 45) afforded somewhat lower torque removal adhesion.

EXAMPLE XVI

As indicated, polyethylene is a highly difficult substrate to adhesively bond, particularly when the substrate is untreated (various adhesion-enhancement procedures being known, such as chemical etching, chemical reaction surface treatment, vapor deposition of adhesion promoters, etc.). It has been established that a peel strength of 5 pounds per linear inch (pli) is a highly satisfactory adhesion level for treated polyethylene.

In order to determine adhesion criteria for bonding efficacy of the compositions of the present invention, a series of tensile strength tests were carried out, using in all cases a silicone urethane methacrylate composition of the present invention derived by condensation reaction from the same silanol starting material as employed for Sample 44. Sample 49 was utilized on an untreated low density polyethylene (LDPE) bonding substrate. Sample 50 was applied to an LDPE substrate which was treated with potassium hydroxide/isopropanol. Sample 51 was applied to an LDPE substrate to which the same potassium hydroxide/isopropanol treatment solution was applied, followed by ultraviolet radiation of the substrate for a period of two minutes. Sample 52 was applied to an LDPE substrate which was treated with corona discharge.

After application of the various sample compositions to the above-described substrates, tensile shear strength was determined by the procedure set forth in ASTM Test Method No. D-1002. The objective of this test was to determine whether treatment of the LDPE substrate by various methods produced significantly differnt tensile shear strength levels, which would indicate that tensile shear strength is highly sensitive to the character of the substrate and thus provides a good indicator of the bonding efficacy of the silicone urethane methacrylate composition.

Tensile shear strength results for Samples 49-52 are set out in TABLE XI below.

TABLE XI

| Sample | Tensile Shear Strength, psi[a] |
|---|---|
| 49 | 56(6) |
| 50 | 40(4) |
| 51 | 42(8) |
| 52 | 45(1) |

[a]The numbers in parentheses are standard deviations

The results show that tensile shear strength is not a good indicator or bonding efficacy for the silicone urethane methacrylate polymer, since the tensile shear strength values achieved with the various sample systems were closely similar, irrespective of the substrate treatment. In contrast, a qualitative comparison for peel strength showed that peel strength is a highly sensitive test for determining adhesive strength of the silicone-urethane-methacrylate cured resins.

EXAMPLE XVII

Peel strength was determined for various silicone urethane methacrylate compositions on substrates of LDPE bonded to each other by such compositions.

The polymer employed in Samples 53, 55, 57, 59 and 60 was formed by condensation reaction utilizing as a starting material the same silanol as utilized to make Samples 49-52. Samples 54, 56 and 58 utilized as the hydride-terminated silicone the same polyethylene oxide/silicone copolymer utilized in Sample 47.

In all cases, the bonded substrates included a 20 mil thick LDPE film bonded to a 0.125 inch thick LDPE sheet, with a 20 mil gap between the respective film and sheet substrates, i.e., a 20 mil thickness of the silicone urethane methacrylate composition. The applied composition was cured with the substrates to which it was applied in bonding relationship to one another, under ultraviolet light with an exposure of two minutes per side (2 minutes radiation exposure through the LDPE sheet and 2 minutes radiation exposure through the LDPE film). After ultraviolet radiation exposure was complete, peel strength of each of the various samples was determined by peeling the film back from the substrate at an angle of 180°, while measuring the removal force, in pounds per linear inch (pli), with a hand-held tension gauge.

The various samples were tested under various sample preparation/curing conditions, as identified in TABLE XII below, which also sets forth the peel strength achieved in each case.

TABLE XII

| Sample | Sample Preparation/ Curing Conditions | Peel Strength/pli[a] |
|---|---|---|
| 53 | Cured in nitrogen filled chamber, at radiation exposure of 2 min/side | 2.8(6) |
| 54 | Same as Sample 53 | 0.4(0) |
| 55 | Cured in air under ultraviolet radiation of 1 min/side, placed in chamber, evacuated and filled with nitrogen, cured under ultraviolet radiation 1 min/side | 2.0(.4) |

TABLE XII-continued

| Sample | Sample Preparation/ Curing Conditions | Peel Strength/pli[a] |
|---|---|---|
| 56 | Same as Sample 55 | 0.4(.1) |
| 57 | Placed in chamber, evacuated, filled with nitrogen and cured under ultraviolet radiation 2 min/side | 6.2(.9) |
| 58 | Same as Sample 57 | 0.1(.1) |
| 59 | Degassed resin, broke vacuum with nitrogen, cured in air under ultraviolet radiation at 2 min/side | 1.5(.2) |
| 60 | Allowed specimen to sit 30 minutes before curing, cured in air under ultraviolet radiation at 2 min/side | 1.5(.2) |

[a]The numbers in parentheses are standard deviations.

As shown by the data, Sample 60, which was cured in air at a radiation exposure of 2 min/side, had the same peel strength as Sample 59 which was initially degassed, followed by vacuum breaking with nitrogen gas, and subsequent cure in air under the same radiation exposure conditions as Sample 60; in each case the peel strength achieved was 1.5 pli. However, when the same composition was cured in a nitrogen atmosphere (Sample 53), peel strength was significantly improved, to 2.8 pli, an increase of 86.7 percent. The corresponding composition based on the polyethylene oxide/silicone copolymer has a very poor peel strength of 0.4 pli (the peel strength of Sample 53 being 7 times higher than the peel strength of Sample 54).

The extremely beneficial effect on peel strength of curing in nitrogen was further evidenced by Sample 55, which initially was cured in air for one minute per side and then cured under nitrogen atmosphere for the same length of radiation exposure. The resulting peel strength, of 2.0 pli, was 33 percent higher than the corresponding air cured samples (59 and 60). Again, the composition based on a polyethylene oxide/silicone copolymer (Sample 56) although similarly cured one minute in air and one minute under nitrogen atmosphere, had the same low peel strength, 0.4 pli, as Sample 54, which had been fully cured in nitrogen atmosphere. These results show that the beneficial effect of nitrogen environment realized with the compositions of the present invention is not achieved using the polyethylene oxide/silicone copolymer based materials of the prior art.

Sample 57 was cured under nitrogen atmosphere for two minutes per side, after the curing chamber in which the sample was disposed was evacuated then filled with nitrogen gas. This sample had a peel strength of 6.2 pli, which represents a highly superior adhesion level for untreated low density polyethylene, and which has not to my knowledge been achievable by any compositions previously utilized in the bonding of such material. Again, the corresponding composition based on the polyethylene oxide/silicone copolymer (Sample 58) exhibited extremely poor peel strength, 0.1 pli.

EXAMPLE XVIII

In addition to polyethylene and particularly low density polyethylene, another substrate that heretofore has generally required effective surface treatment to achieve good adhesion levels is Tedlar ® tetrafluoroethylene/hexafluoropropylene copolymer.

Using a composition of the present invention, of the same type as utilized in Sample 60, on Tedlar ® tetrafluoroethylene/hexafluoropropylene copolymer and aluminum substrates primed with methacryloxypropyl triacetoxysilane, a peel strength of 10.5 pli was achieved. In this case no special sample preparation or curing techniques were required, and the sample was cured in air with a two minute ultraviolet radiation exposure.

Other substrate materials such as glass, Valox 420 ® polybutylene terephthalate, nylon and steel can be bonded to Tedlar ® tetrafluoroethylene/hexafluoropropylene copolymer in the same manner, as well as to other polyfluoroalkene polymers and copolymers.

What is claimed is:

1. A method of bonding a first surface formed of polyethylene, to a second surface, comprising:
   (1) applying to at least one of said first and second surfaces a composition comprising a polymerizable polysiloxane urethane compound formed as a reaction product of:
      (a) a polysiloxane carbinol having a molecular weight of from about 5,000 to about 50,000, of the formula wherein:
   each R independently is $C_1$-$C_8$ alkyl, $C_3$-$C_6$ cycloalkyl, or phenyl;
   each R' independently is linear $C_4$-$C_{20}$ alkylene; and
   x = 50–700;
      (b) a polyisocyanate; and
      (c) a polyfunctional compound having at least one functional group which is reactive with an isocyanate group of said polyisocyanate and after reaction therewith provides an ethylenic functional group in the reaction product;
   (2) placing the first and second surfaces in bondable relationship to one another in a curing zone;
   (3) establishing vacuum in said curing zone;
   (4) breaking said vacuum with a gas consisting essentially of nitrogen, to provide a gas environment thereof in said curing zone; and
   (5) exposing said composition to elevated temperature and/or actinic radiation for sufficient time to cure same in said gas environment in said curing zone, thereby bonding said first and second surfaces to one another.

2. A method according to claim 1, wherein said polyethylene is low density polyethylene.

3. A method according to claim 1, wherein both the first and second surfaces are formed of polyethylene.

4. A method according to claim 1, wherein both the first and second surfaces are formed of low density polyethylene.

5. A process according to claim 1, wherein the pressure in said curing zone after establishment of vacuum therein is from about 0.1 to 10 Torr.

6. An article comprising a first surface formed of polyethylene and a second surface, wherein the first and second surfaces are bonded to one another by a method according to claim 1.

* * * * *

UNITED STATES PATENT AND TRADEMARK OFFICE
CERTIFICATE OF CORRECTION

PATENT NO. : 4,684,538

DATED : August 4, 1987

INVENTOR(S) : Philip T. Klemarczyk

It is certified that error appears in the above-identified patent and that said Letters Patent is hereby corrected as shown below:

Col. 6, line 10, change "$C_4C_{20}$" to --$C_4-C_{20}$--.

Col. 10, line 39, change "moleculare" to --molecular--.

Signed and Sealed this

Fifteenth Day of December, 1987

Attest:

DONALD J. QUIGG

Attesting Officer

Commissioner of Patents and Trademarks